Dec. 3, 1957 W. H. BASELT 2,815,092
BOLSTER MOUNTED TREAD BRAKE ARRANGEMENT
Filed April 8, 1954 2 Sheets-Sheet 1
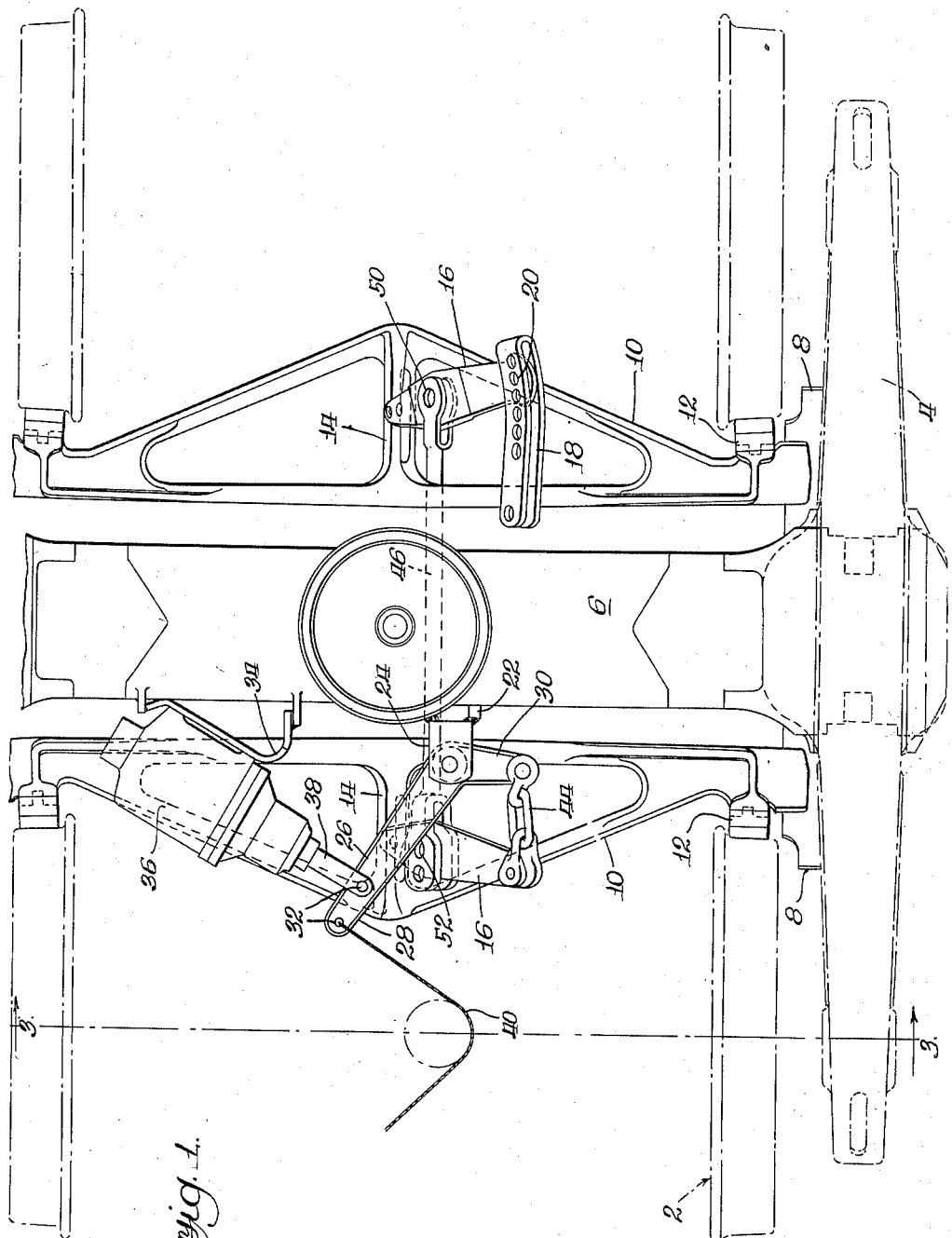
INVENTOR.
Walter H. Baselt
BY
Orin O. B. Garner
Atty.

Dec. 3, 1957 W. H. BASELT 2,815,092
BOLSTER MOUNTED TREAD BRAKE ARRANGEMENT
Filed April 8, 1954 2 Sheets-Sheet 2
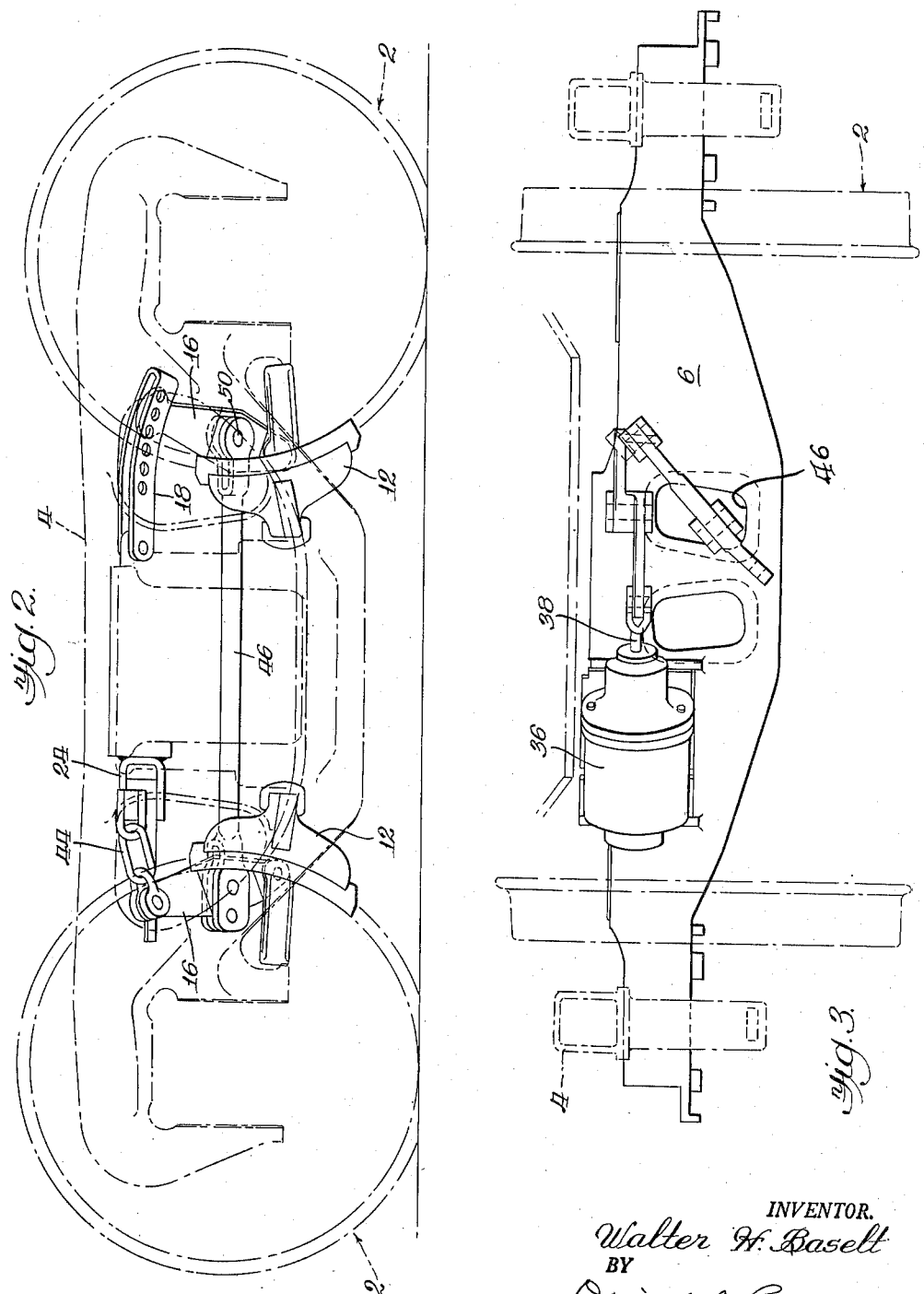
INVENTOR.
Walter H. Baselt
BY
Orrin O. B. Garnier
Atty.

United States Patent Office 2,815,092
Patented Dec. 3, 1957

2,815,092

BOLSTER MOUNTED TREAD BRAKE ARRANGEMENT

Walter H. Baselt, Flossmoor, Ill., assignor to American Steel Foundries, Chicago, Ill., a corporation of New Jersey Application April 8, 1954, Serial No. 421,923

3 Claims. (Cl. 188—52)

The invention relates to railway car brakes and more particularly to a novel unit cylinder single shoe brake.

The invention comprehends the utilizing of a bolster mounting for a unit cylinder which, in turn, is operative to actuate a braking system for a conventional railway car truck. Additionally, the invention comprehends a novel angle mounting on the truck bolster of the unit actuating cylinder coupled with a novel bell crank and lever arrangement which permits the bolster to be mounted in a lower position in the general organization of the truck.

Accordingly, it is a primary object of the invention to provide a railway car truck with a novel bolster mounted brake actuating mechanism. It is a further object of the invention to provide a novel linkage arrangement for said brake mechanism.

It is a more specific object of the invention to provide a bolster mounted bell crank operatively coupled with live and dead levers in turn connected to shoe carrying brake beams, the levers and linkages being arranged so that the truck accommodates a lower bolster mounting than heretofore present in the art.

These and other objects of the invention will become apparent in the course of the following description and from an examination of the concerned drawings, wherein:

Figure 1 is a top plan view of a railway car truck incorporating the novel brake arrangement;

Figure 2 is a side elevational view of the structure shown in Figure 1, and

Figure 3 is a fragmentary sectional view taken approximately along line 3—3 of Figure 1.

Describing the invention in detail and, directing attention first to Figures 1 and 2, it will be seen that the truck comprises a pair of wheel and axle assemblies indicated generally at 2. Side frames 4 are conventionally carried (not shown) by the wheel and axle assemblies 2. A bolster 6 is carried between the side frames 4 and extends transversely thereof centrally of the truck.

The side frames 4 may be provided as at 8 on their inboard sides with brackets which guidably support brake beams 10 as is well understood by those skilled in the art. The brake beams 10 carry shoes 12 which are arranged to engage the tread of the wheels of the wheel and axle assemblies 2. Each brake beam 10 is provided with a conventional center strut 14 said center strut being arranged to pivotally attach to the lower end of respective brake levers 16, 16. As best seen in Figure 3 each brake lever 16 extends angularly upwardly from the associated brake beam 10.

Directing attention to the right hand brake assembly as seen in Figure 1, it will be noted that a bracket 18 is provided, said bracket being affixed at one end to the car body (not shown). The upper end of the right hand brake lever 16 is pivotally secured to the bracket 18 as at 20, making the right hand lever 16 a dead brake lever.

Directing attention to the left hand side of the truck as seen in Figure 1 it will be noted that the bolster 6 is provided with a boss 22 said boss mounting a horizontal bracket 24. A bell crank lever 26 is arranged for pivotal mounting or fulcruming intermediate its ends to the bracket 24. The bell crank lever 26 comprises angularly related arms 28 and 30 the arm 28 having at its extremity a plurality of holes 32. The bolster 6 is additionally provided with another bracket 34, said bracket 34 being arranged to mount a unit operating cylinder 36. It will be noted that the operating cylinder 36 is mounted on the bolster in such a manner so that its longitudinal axis is angularly related as seen in horizontal view to the longitudinal axis of the bolster 6. A piston rod 38 extends from the inboard end of the operating cylinder 36 and is pivotally connected to one of the holes 32 of the bell crank lever 26. The operating cylinder 36 is conventionally operated by air pressure or other suitable fluid means normally associated with a railway car truck.

The outboard hole 32 of the bell crank lever 26 may be connected to a cable 40 which, in turn, may be operatively connected (not shown) to a suitable hand brake actuating mechanism.

The arm 30 of the bell crank lever 26 extends from the point of fulcrum in a direction generally transversely of the truck. A clevis, or link arrangement, 44 is pivotally connected to the end of the arm 30 remote from its fulcrum. The link arrangement 44 has its opposite end pivotally connected to the upper end of the left hand brake lever 16. Thus it will be seen that the left hand brake lever 16, though pivotally connected at its opposite ends to the brake beam 10 and link 44, respectively, is not fixedly fulcrumed relative to the truck consequently may be termed a live lever.

A connecting rod 46 is arranged in the mechanism to extend generally longitudinally of the trucks and to extend through an appropriate aperture 48 provided in the bolster 6 as best seen in Figure 3. The right hand end of the rod 46 is pivotally connected as at 50 to the intermediate portion of the right hand dead brake lever 16. The left hand end of the rod 46 is pivotally connected as at 52 to an intermediate portion of the left hand brake lever 16.

In operation of the brake arrangement, the actuating cylinder 36 is energized urging the piston rod 38 to move horizontally thereby pivoting the bell crank lever 26 in a counterclockwise direction as seen in Figure 1. Counterclockwise movement of the bell crank lever 26 causes the upper end of the left hand live brake lever 16 to be carried to the right as seen in Figure 1 via the link connection 44 between the arm 30 and the brake lever 16. Movement of the left hand brake lever 16 urges the connecting rod 46 to the right and additionally urges the left hand brake beam 10 to the left as seen in Figure 1 thereby bringing the related brake shoe assemblies 12 into engagement with the associated wheel treads of the left hand wheel and axle assembly 2. Movement of the connecting rod 46 to the right as seen in Figure 1 causes the right hand dead brake lever 16 to pivot about its upper fulcrum 20 thereby carrying the right hand brake beam 10 which is connected to the lower end of the right hand brake lever 16 to the right and into engagement with the wheel treads of the associated right hand wheel and axle assembly 2. Thus the beams are actuated and the brake head assemblies brought into engagement with the wheels to decelerate said truck.

If it is desired to manually operate the system, the initial actuating force may be afforded the lever 26 by the cable 40 which, in turn, is mechanically connected to conventional hand brake operating means (not shown).

Upon release of the actuating pressure in the cylinder 36 the piston rod 38 is moved inwardly toward the cylinder thereby causing the bell crank lever 26 to rotate in a clockwise direction as seen in Figure 1 and reversing the action above described whereby the brake head assemblies 12 are urged to disengage the wheels of the related wheel and axle assemblies 2.

I claim:

1. In a tread brake arrangement for a railway car truck comprising a pair of spaced wheel and axle assemblies, a pair of spaced side frames supported thereby, and a transversely extending bolster supported at its ends by the side frames, the combination of: a pair of brake beams disposed inwardly adjacent the respective assemblies and carrying brake shoe assemblies engageable therewith, a pair of live and dead brake levers connected to the respective brake beams, a rod having its opposite ends pivotally connected to the respective brake levers, the dead brake lever being fulcrumed at its upper end to the car, a power cylinder mounted on the bolster, said cylinder being disposed between the side frames and adjacent the live brake lever with its operating axis forming an angle of substantially 30° with the longitudinal axis of the bolster, a dead bell crank lever fulcrumed intermediate its ends to the bolster and having one end connected to said cylinder, and a link movably connecting the other end of the bell crank lever to the upper end of the live brake lever, the connections between the bell crank lever and the cylinder, bolster, and link and the connection between the link and the live brake lever all being in relatively close proximity to each other.

2. A tread brake arrangement for a railway car truck according to claim 1, wherein the brake levers have their lower ends pivotally connected to their respective brake beams, and wherein the rod interconnecting the brake levers is a compression rod and its opposite ends pivotally connected to medial portions of the respective brake levers.

3. In a tread brake arrangement for a railway car truck comprising a frame having a pair of longitudinally extending members interconnected by at least one transversely extending member and a pair of supporting wheel and axle assemblies, the combination of: a pair of brake beams disposed inwardly adjacent the respective assemblies and carrying brake means engageable therewith, a pair of live and dead brake levers pivotally connected to the respective brake beams, a rod interconnecting the brake levers, the dead brake lever being fulcrumed at its upper end to the car, a power cylinder mounted on the transverse member and disposed between the longitudinally extending members with its longitudinal axis forming an angle of substantially 30° with the longitudinal axis of the transverse member, and a dead bell crank lever fulcrumed intermediate its ends to the transverse member and having its opposite ends operatively connected to the cylinder and the upper end of the live brake lever, respectively, the connections between the bell crank lever and the cylinder, transverse member, and live brake lever all being in relatively close proximity to each other.

References Cited in the file of this patent
UNITED STATES PATENTS

| | | |
|---|---|---|
| 2,181,041 | Baselt | Nov. 21, 1939 |
| 2,211,712 | Baselt | Aug. 13, 1940 |